(12) United States Patent
Zeng et al.

(10) Patent No.: US 11,756,341 B2
(45) Date of Patent: Sep. 12, 2023

(54) SYSTEMS AND METHODS FOR PROVIDING PREDICTIVE DISTANCE-TO-EMPTY FOR VEHICLES

(71) Applicant: Ford Global Technologies, LLC, Dearborn, MI (US)

(72) Inventors: Xiangrui Zeng, Northville, MI (US); John Schmotzer, Canton, MI (US); Mark Poll, Plymouth, MI (US); Suhag Raval, Southfield, MI (US); Praveen Bandi, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/805,754

(22) Filed: Jun. 7, 2022

(65) Prior Publication Data

US 2022/0383664 A1    Dec. 1, 2022

Related U.S. Application Data

(62) Division of application No. 16/353,922, filed on Mar. 14, 2019, now Pat. No. 11,361,595.

(51) Int. Cl.
*G07C 5/00* (2006.01)
*G06N 5/04* (2023.01)
*G06N 20/00* (2019.01)
*G07C 5/08* (2006.01)

(52) U.S. Cl.
CPC .............. *G07C 5/004* (2013.01); *G06N 5/04* (2013.01); *G06N 20/00* (2019.01); *G07C 5/085* (2013.01)

(58) Field of Classification Search
CPC ........ G07C 5/004; G07C 5/085; G06N 20/00; G06N 5/04
See application file for complete search history.

(56) References Cited

U.S. PATENT DOCUMENTS

| 6,487,477 | B1* | 11/2002 | Woestman | B60W 10/08 340/439 |
| 9,587,954 | B2* | 3/2017 | Gusikhin | G06Q 10/06311 |
| 2012/0143413 | A1* | 6/2012 | Cho | B60L 15/2045 701/22 |
| 2013/0073113 | A1* | 3/2013 | Wang | B60W 20/11 701/1 |
| 2013/0158758 | A1* | 6/2013 | Kim | G07C 5/004 701/123 |

(Continued)

*Primary Examiner* — Ramsey Refai
(74) *Attorney, Agent, or Firm* — Joseph Zane; Eversheds Sutherland (US) LLP (57) ABSTRACT

Systems and methods are disclosed for providing predictive distance-to-empty (DTE) assessments for vehicles that can include electric, gas, or hybrid vehicles. An example method includes determining a plurality of learned parameters of vehicle operation of a vehicle based on a plurality of energy consumption parameters of the vehicle; determining a plurality of predictive parameters of vehicle operation of the vehicle selected from any combination of weather data or navigation data, the navigation data being determined relative to a planned route and applying a DTE function for the energy source, the DTE function utilizing the plurality of learned parameters of vehicle operation, and the plurality of predictive parameters of vehicle operation of the vehicle, based on a current capacity of the energy source to determine a DTE for the vehicle.

8 Claims, 5 Drawing Sheets

(56) References Cited

U.S. PATENT DOCUMENTS

| | | | |
|---|---|---|---|
| 2015/0032318 A1* | 1/2015 | Gao | B60H 1/00392 |
| | | | 903/903 |
| 2015/0170426 A1* | 6/2015 | You | B60L 1/003 |
| | | | 701/123 |
| 2018/0238698 A1* | 8/2018 | Pedersen | G05D 1/0285 |
| 2018/0350366 A1* | 12/2018 | Park | G10L 15/30 |
| 2020/0171972 A1* | 6/2020 | Cha | G07C 5/0825 |

* cited by examiner

SYSTEMS AND METHODS FOR PROVIDING PREDICTIVE DISTANCE-TO-EMPTY FOR VEHICLES

CROSS-REFERENCE TO RELATED APPLICATIONS

The present application claims priority to, the benefit of, and is a divisional application of 16/353,922, filed Mar. 14, 2019, which is hereby incorporated by reference herein in its entirety.

TECHNICAL FIELD

The present disclosure relates to systems and methods that provide predictive distance-to-empty (DTE) assessments for vehicles that can include electric, gas, or hybrid vehicles. Some embodiments allow for the use of real-time feedback and modeling of vehicle parameters based on machine learning.

BACKGROUND

Distance-to-empty (DTE) is a distance number indicating the distance that a vehicle can be driven before the battery, or energy source, is depleted (for battery electric vehicles) or a fuel tank goes empty (for internal combustion engine vehicles). It can be displayed to the driver on the vehicle instrument cluster or mobile apps. For battery electric vehicles, an accurate DTE is crucial to reduce a customer's range anxieties and increase the customer's comfort and confidence in driving the vehicle. To be sure, when the DTE is not accurate, customers may be at a disadvantage. In use cases such as battery electric vehicles (BEVs), users may be discouraged from considering a future electric vehicle purchase. These drawbacks may also negatively affect other potential customers' views on the vehicles, especially battery electric vehicles.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

In some embodiments, the systems and methods disclosed herein provide DTE analyses for vehicles, as well as actionable feedback to users through a human machine interface of the vehicle. Generally, any vehicle can utilize the predictive DTE systems and methods disclosed herein, but some use cases enable a reduction in user anxiety and improve adoption of certain vehicle types, such as battery electric vehicles. The systems and methods herein may use vehicle historical energy consumption rate information (in the unit of kWh/km). The actual DTE is strongly dependent on future driving and environmental information, including future temperature, future speed distribution, and future trip elevation changes—just to name a few. Thus, the systems and methods herein provide various means for obtaining and using predictive or future data to improve DTE calculations.

Broadly, the systems and methods herein are configured, in some embodiments, to use vehicle connectivity to obtain predictive information from a cloud system (service provider) or other third-party resources, and utilize this information to provide an optimized estimation of DTE for battery electric vehicles (BEVs). In some embodiments, this predictive DTE can be utilized with or without trip route information from a navigation device of the vehicle or a navigation service provider.

In various embodiments, available data for DTE estimations conducted in accordance with the present disclosure include, but is not limited to, historical information learned from the vehicle's operation, information about a navigation map and elevation obtained either onboard or from a service provider (e.g., a cloud system), and information obtained from the cloud system about traffic and/or weather forecasts. The information from the service provider or third-party system is informative since traffic congestion and future temperature have an impact on DTE estimations. Bringing traffic and weather forecast data into the DTE analyses disclosed herein significantly improves the accuracy of the DTE estimation.

In general, vehicles adapted for use in accordance with the present disclosure include a vehicle controller that can be configured to perform aspects of machine learning. For example, in a learning phase, the vehicle controller can learn parameters that can describe a driver's driving style, climate control preferences, vehicle accessory usage, and average weekly vehicle operation schedule. When the driver provides a trip plan through the navigation functionality of the vehicle, the vehicle controller can communicate with the service provider to obtain traffic speed and outdoor temperature for a planned trip or route. Then the vehicle controller can combine these data with elevation data (obtained from either an onboard map or a service provider map) and learned parameters (on driving style and climate control preferences) to estimate the energy consumption for the planned route. The vehicle controller may also obtain weather forecast data from the service provider, and combine the weather forecast data with learned parameters (on driving style, climate control preferences, and weekly schedule as an example) to estimate an energy usage rate for a future time frame that extends after the planned trip is completed.

Finally the vehicle controller can also combine the estimated energy usage information and provide a DTE estimation in an ad-hoc manner, with or without regard to any planned route. In some embodiments, aspects of route planning can include calculations of a trip period (horizon within a trip) of a planned route, as well as a post-trip period (horizon beyond the trip) of the planned route.

That is, the DTE estimation systems and methods herein can be executed with or without a planned route. If the driver does not use a navigation system, the systems and methods herein can improve DTE accuracy by incorporating weather forecast data from the service provider and consider DTE changes due to climate control energy usage. These and other aspects and advantages of the present disclosure are described in greater detail herein with reference to the collective drawings.

Illustrative Architecture

Figure 1:
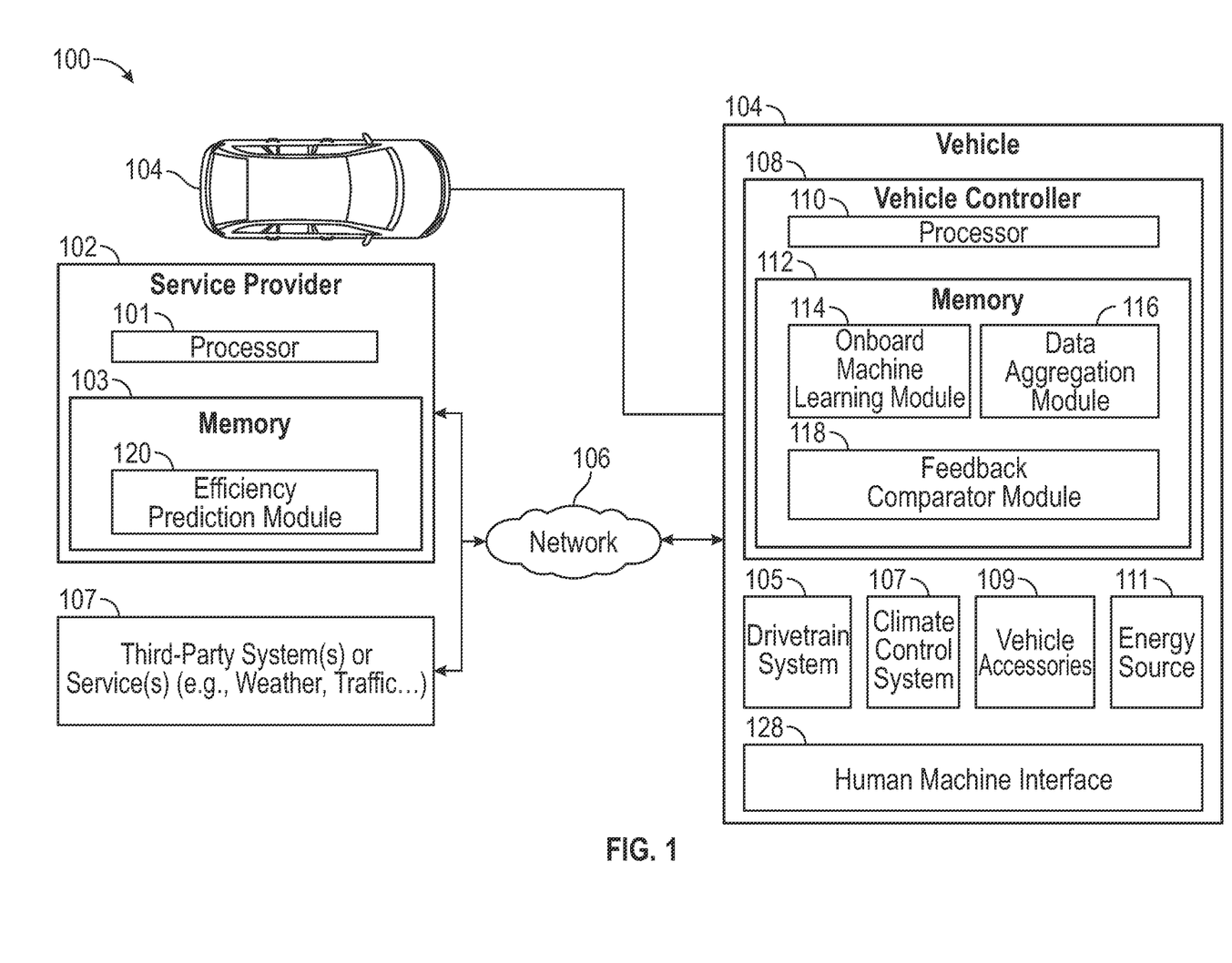
FIG. 1 depicts an illustrative architecture in which techniques and structures for providing the systems and methods disclosed herein may be implemented.

Turning now to the drawings, FIG. 1 depicts an illustrative architecture 100 in which techniques and structures of the present disclosure may be implemented. The illustrative architecture 100 may include a service provider 102, a vehicle 104, and a network 106. The network 106 may include any one or a combination of multiple different types of networks, such as cable networks, the Internet, wireless networks, and other private and/or public networks. In some instances, the network 106 may include cellular, Wi-Fi, or Wi-Fi direct. In some embodiments, the architecture 100 can comprise one or more third-party systems such as third-party system 107 that provides external data related to aspects such as weather data or traffic data. The service provider 102 can be implemented in a cloud computing environment or as a virtual or physical server. In some embodiments, the service provider 102 comprises at least a processor 101 and memory 103. The processor 101 is configured to execute instructions stored in memory 103 to provide one or more of the DTE estimation features disclosed herein, either alone or in conjunction with the vehicle 104 (specifically the vehicle controller 108 disclosed below).

Generally, the vehicle 104 comprises a vehicle controller 108 that comprises a processor 110 and a memory 112. The memory 112 comprises modules such as an onboard machine learning module 114, a data aggregation module 116, and a feedback comparator module 118. The vehicle 104 generally comprises a drivetrain system 105, a climate control system 107, one or more vehicle accessories 109, and an energy source 111. Also, the service provider 102 includes an efficiency prediction module 120 that performs DTE calculations or estimates. Each of these elements or modules is discussed in terms of individual and collective operations with respect to FIG. 2.

In some embodiments, the features and functions of the present disclosure related to DTE estimation can be performed entirely by the service provider 102. In other embodiments, the DTE estimations can be performed at the vehicle level by the vehicle controller 108, and in other embodiments the DTE estimation can be executed cooperatively between the service provider 102 and the vehicle controller 108 as will be described in greater detail herein.

Figure 2:
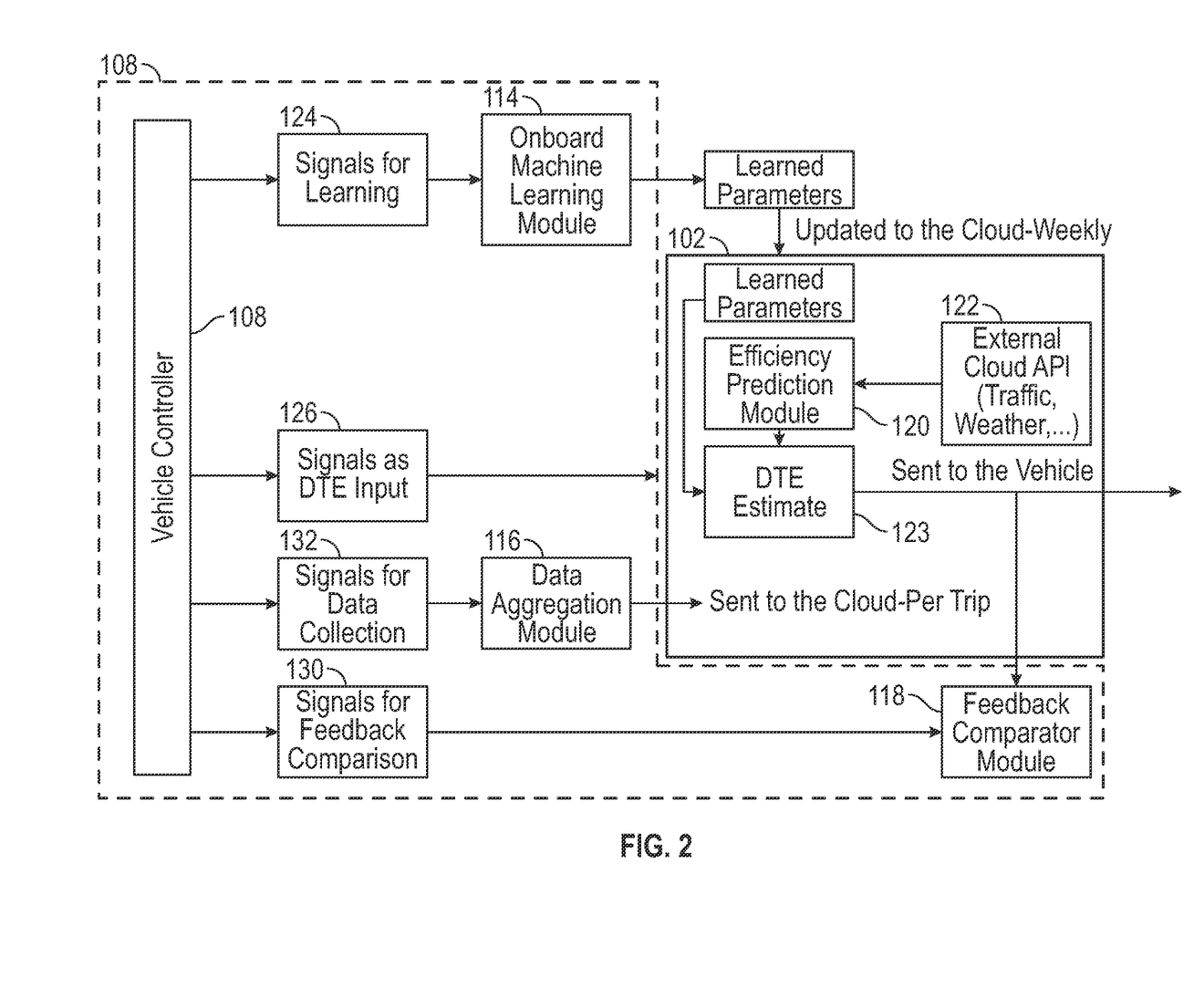
FIG. 2 is an example signal flow or schematic flow of a distance-to-empty (DTE) estimation process that can be performed in accordance with various embodiments disclosed herein.

FIGS. 1 and 2 collectively illustrate an example application signal flow where the vehicle controller 108 of the vehicle 104 provides various types of output that can be used by components of the service provider 102. In some embodiments, the vehicle controller 108 continuously or periodically collects and updates signals 124 related to a plurality of learned parameters of vehicle operation of the vehicle. In some embodiments, this collection task runs continuously onboard and updates learned parameters. These learned parameters are indicative of how a driver of the vehicle 104 uses energy in different scenarios, and when the vehicle 104 is usually operated on each day of a week.

In various embodiments, nominal values on parameters can be used before any learning starts. As the vehicle 104 operates, the onboard machine learning module 114 of the vehicle controller 108 can be executed, and the parameters can be updated to represent a behavior of the vehicle. The plurality of learned parameters can be stored onboard in the memory 112 of the vehicle controller 108. In some embodiments, the plurality of learned parameters can also be uploaded to the service provider 102 for storage. In some embodiments, the plurality of learned parameters can be batched for asynchronous transmission from the vehicle 104 to the service provider 102 as desired.

The efficiency prediction module 120 of the service provider 102 can be configured to utilize the signals 126 as DTE input, as well as the learned parameters, the current vehicle status, and traffic and weather information obtained from the third-party system (collectively external cloud API 122, which is used to access the third-party system(s) 107). The efficiency prediction module 120 can be executed when a DTE calculation request is requested. Again, the efficiency prediction module 120 receives DTE values from input signals 126 from individual vehicle modules or in aggregate from the vehicle controller 108. The efficiency prediction module 120 calculates DTE estimate values 123 and can also output DTE estimate values for display on a human machine interface (HMI) 128 of the vehicle 104.

According to some embodiments, the feedback comparator module 118 of the vehicle controller 108 can be executed to compare estimated energy consumption with actual energy consumption for a trip with a known route. The feedback comparator module 118 can receive signals 130 for feedback comparison from the vehicle controller 108. The result may be displayed on the HMI 128 in some embodiments. In some embodiments, the feedback comparator module 118 can monitor whether an actual route taken by the vehicle 104 is the same or substantially similar to the planned route. In some embodiments, a comparison is not made between the estimated energy consumption and the actual energy consumption when the actual route deviates from the planned route. Additional details on the operations of the feedback comparator module 118 are provided infra.

According to some embodiments, the data aggregation module 116 of the vehicle controller 108 can be configured to collect and aggregate various vehicle data, such as signals 132 that are not covered by other data collection channels provided to the service provider 102 by the vehicle controller 108. Because the size of high-frequency data may be too large to send to the service provider 102 directly, some level of onboard aggregation can be implemented. The data aggregation module 116 of the vehicle controller 108 can execute continuously (or periodically) onboard the vehicle, allowing the vehicle controller 108 to transmit these data to the service provider 102 at a lower frequency. For example, the vehicle controller 108 can transmit aggregated data after every trip, or at the beginning or end of every day. The uploaded data may be stored for further analysis by the service provider 102. Additional details regarding collection and assessment of a plurality of learned parameters of vehicle operation will be provided in greater detail herein.

According to some embodiments, energy consumption and energy consumption rate values can be calculated over two distinct portions or periods of a planned route. In some embodiments, the DTE value is calculated using an aggregate or combination of two energy estimates. As noted above, these periods of time can include a trip period and/or a post-trip period. For the trip period, a total energy consumption (kWh) can be estimated by the efficiency prediction module 120 of the service provider 102. Weather data and traffic speed data can be used in the energy estimation by the efficiency prediction module 120. For the post-trip period (e.g., from the end of the trip, to the depletion of the energy source 111), an overall energy rate (kWh/km) can be estimated for the post-trip period. Weather forecast data can be used in the post-trip energy consumption estimation as well. In general, available battery energy is determined as well (also referred to as a current capacity of an energy source 111 of the vehicle 104). This value can be received from the vehicle controller 108.

In general, an example method or algorithm for estimating DTE over both of these periods includes determining an available energy level of the energy source 111 and subtracting a predicted energy usage (e.g., efficiency) for a trip period. This calculation provides a remaining energy level of the energy source 111 for any post-trip period, which can be utilized to determine a remaining DTE value for the energy source 111. When a post-trip distance is known, this can be utilized in combination with the remaining energy level of the energy source 111 and a predicted energy usage (e.g., efficiency) for the post-trip period to calculate a DTE over the two periods.

In more detail, if a distance of a trip with a known route is $D_{trip}$, the battery energy available before a trip (current capacity of the energy source 111 of the vehicle 104) is $E_{bat}$, the predicted total energy consumption for the trip is $E_{trip}$, the predicted overall energy rate beyond the trip (e.g., post-trip period) is $\eta_{beyond}$, then the DTE value will be calculated as follows:

$$D_{DTE} = D_{trip} + \frac{E_{bat} - E_{trip}}{\eta_{beyond}}.$$

A predicted overall energy rate beyond the trip $\eta_{beyond}$ is calculated by determining a distance of the post-trip operation of the vehicle using a suitable method (examples disclosed infra). Then, the method includes estimating the energy consumption over the post-trip operation of the vehicle (e.g., post-trip period) and then estimating the energy rate over the post-trip period of the vehicle.

This estimated energy rate can be used as the energy rate from the end of the trip, to the depletion of the energy source 111 of the vehicle 104, to calculate the DTE value. It will be understood that the post-trip operation estimates may be slightly longer or shorter than the overall DTE estimate, because it can be calculated before the DTE estimate is obtained. This is acceptable since it will be assumed that the average energy rate during the post-trip operation of the vehicle and the DTE range are very close to one another in value.

The following paragraphs provide descriptions of energy consumption models for use in accordance with the present disclosure. In some embodiments, the energy consumed by the vehicle 104 can be divided into four categories (e.g., plurality of energy consumption parameters): (1) energy used for driving the wheels through the drivetrain system 105, (2) energy used for climate control through the climate control system 107, (3) energy used for accessories through the one or more vehicle accessories 109, and (4) energy loss because of external factors (e.g., low temperature).

In some embodiments, energy consumption for the drivetrain system 105 can be learned in secondary states such as when a trailer is being towed by the vehicle 104. Learning may take place by the vehicle controller 108 for additional states specific to individual trailers so that adjustments can be made when a specific trailer is connected. The typical mass loading, vehicle dynamics, and aerodynamic properties imposed by the trailer on the vehicle 104 can be reflected across the four parameters listed above by tracking energy consumption separately for these secondary states. Thus, the vehicle controller 108 can be configured to determine when a triggering condition occurs, such as when a trailer is connected to the vehicle 104. This could include sensing when a trailer is plugged into a trailer interface of the vehicle 104.

For both portions of a planned route, such as the trip period and the post-trip period, the energy consumption for the four energy consumption parameters is modeled by the onboard machine learning module 114 of the vehicle controller 108 and can be calculated when a DTE calculation request is received. The learned driving energy consumption rates in different scenarios, plus the predictive information including the weather forecast, traffic conditions, and elevation information, can be used in the energy consumption models to provide an accurate estimation of DTE.

Figure 3A:
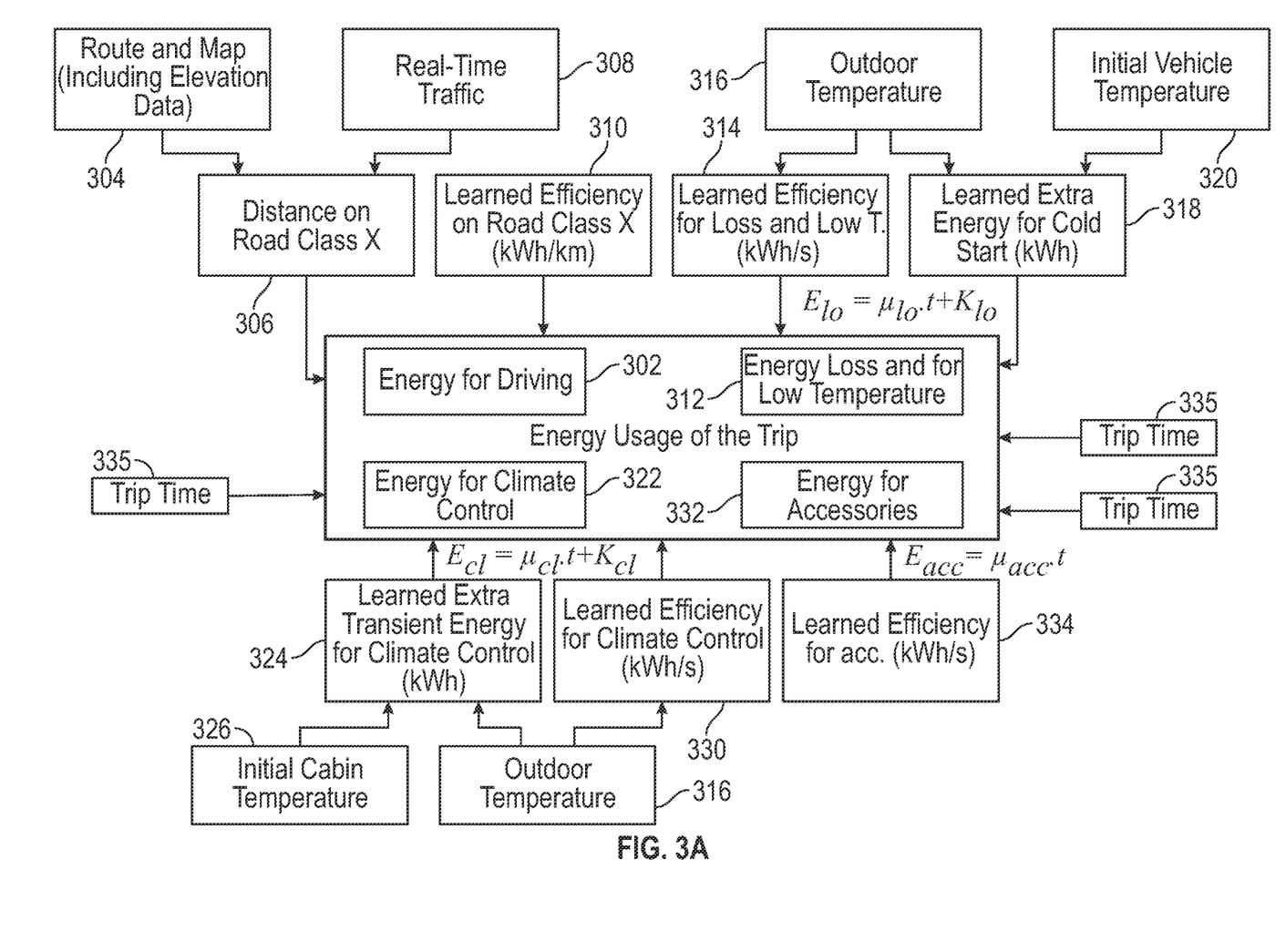
FIG. 3A is an example schematic diagram of a process for calculating an estimated DTE in a trip period.

FIG. 3A is a schematic diagram that illustrates energy consumption data calculations performed for a trip period of a planned route. This process is referred to as determining a plurality of energy consumption parameters for a vehicle on a planned route. The plurality of energy consumption parameters can be referred to as "first" parameters when calculated in reference to the trip period. More specifically, the process illustrated in FIG. 3A includes calculating energy consumption data for a trip period of a planned route. It will be understood that some processes included in the energy consumption data calculations are derived from learned processes as mentioned above. Some data is obtained from third-party resources, such as weather and/or traffic data.

In some embodiments, the process includes calculating a driving-based energy consumption parameter 302 based on any combination of a distance that the vehicle will travel on a trip period (route and map data with elevation 304) over a specified road class 306, along with real-time traffic data 308, and a learned road class efficiency 310 for the vehicle. In some embodiments, the process comprises calculating a temperature-based energy loss parameter 312 based on any combination of a learned temperature-based energy loss 314 for the vehicle based on outdoor temperature data 316, and a learned cold start-based energy loss 318 for the vehicle which is a function of the outdoor temperature data 316 and a current vehicle temperature 320 (e.g., initial vehicle temperature).

In various embodiments, the process for calculating the energy usage for a trip period further comprises calculating a first climate control-based energy consumption parameter 322 based on any combination of a learned transient extra energy for climate control 324, which is a function of an initial cabin temperature data 326 and the outdoor temperature data 316, and a learned efficiency for climate control 330 which is a function of the outdoor temperature data 316. In some embodiments, the process for calculating the energy usage for a trip further comprises calculating a first vehicle accessories-based energy consumption parameter 332 based on a learned efficiency for vehicle accessories 334. In various embodiments, the energy consumption parameters are calculated with reference to a trip time 335 (e.g., the length of vehicle operation when in a trip period).

Figure 3B:
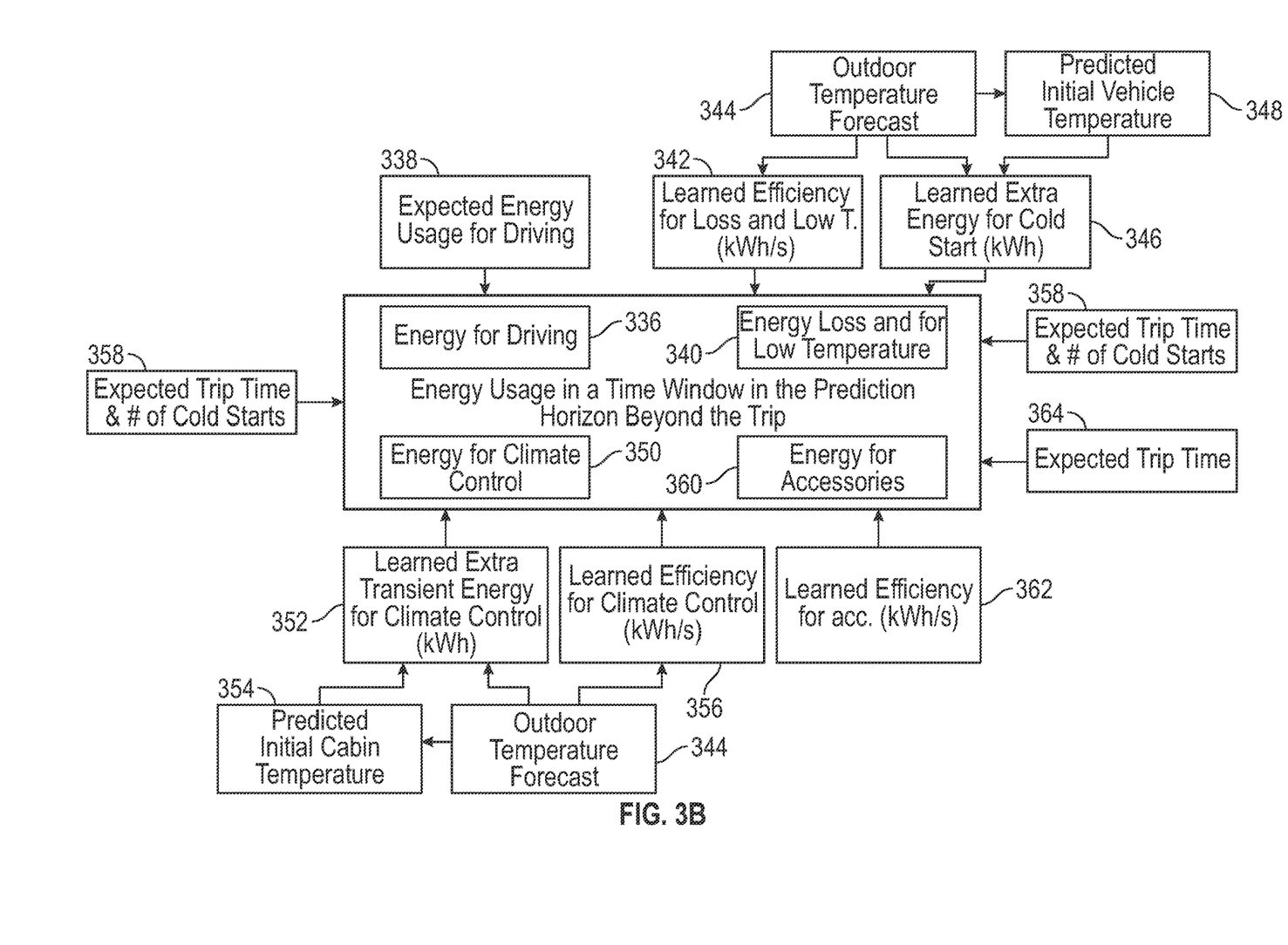
FIG. 3B is an example schematic diagram of a process for calculating an estimated DTE in a post-trip period.

FIG. 3B is a schematic diagram that illustrates energy consumption data calculations performed in a post-trip or beyond the horizon time frame. The plurality of energy consumption parameters can be referred to as "second" parameters when calculated in reference to the post-trip period. In some embodiments, the method includes calculating energy consumption for operating the vehicle after completion of the planned route by calculating a driving-based energy consumption parameter 336 based on an expected energy consumption 338 for driving the vehicle. In various embodiments, the method can include calculating a temperature-based energy loss parameter 340 based on any combination of a learned temperature-based energy loss 342 for the vehicle based on future outdoor temperature data 344, and a learned cold start-based energy loss 346 for the vehicle which is a function of the future outdoor temperature data 344 and a predicted initial vehicle temperature 348. It will be understood that the future outdoor temperature data 344 can be obtained from any third-party platform or service providing weather data.

In various embodiments, the method can include calculating a climate control-based energy consumption parameter 350 based on a learned extra transient energy for climate control 352, which is a function of a predicted initial cabin temperature data 354 and the future outdoor temperature data 344. This calculation can also include a learned efficiency for climate control 356 which is a function of the future outdoor temperature data 344. In some embodiments, the climate control-based energy consumption parameter 350 is further affected by an expected or predicted number of cold starts 358 that may occur. The cold start predictive measures can also be used in the calculation of the temperature-based energy loss parameter 340. According to some embodiments, the method can also comprise utilizing the first vehicle accessories-based energy consumption parameter 360 that is a function of a learned efficiency of vehicle accessories 362. In some embodiments, these values are determined as a function of an expected length of a trip (trip time 364).

Additional descriptive details regarding the calculation of energy consumption using the aforementioned plurality of energy consumption parameters are provided in greater detail in the following paragraphs. Again, these energy consumption analyses are discussed first with reference to a trip period and then with respect to a post-trip period.

In general, the energy consumption within the trip period is a sum of the energy consumption across the four aforementioned energy consumption parameters according to the following equation:

$$E_{trip} = E_{dr} + E_{cl} + E_{acc} + E_{lo}$$

It will be understood that $E_{dr}$ represents the driving-based energy consumption parameter, which relates to the drivetrain system 105 of the vehicle 104 (see FIG. 1). $E_{cl}$ represents the climate control-based energy consumption parameter which relates to the climate control system 107 of the vehicle 104. In some embodiments, $E_{acc}$ represents the vehicle accessories-based energy consumption parameter which relates to the vehicle accessories 109 of the vehicle 104, and $E_{lo}$ represents the temperature-based energy loss parameter and how temperature induces loss in the energy storage 111 of the vehicle 104.

The driving-based energy consumption parameter $E_{dr}$ within a trip period can be calculated using the following equation $E_{dr} = \Sigma_i \eta_i \cdot D_i$, where $\eta_i$ is the learned energy rate (kWh/km or kilowatts per hour, per kilometer) on Road Class i, and $D_i$ (km) is the distance on Road Class i for the trip period. The road class is defined by an average speed on the road and a road grade (determined from navigation or map data).

The value of $\eta_i$ can be obtained directly from the saved learned parameters in some instances. The value of $D_i$ can be obtained from processed route data with real-time traffic speed and elevation information received from a third-party traffic or navigation data service.

The climate control-based energy consumption parameter $E_{cl}$ can be calculated using the following equation: $E_{cl} = \mu_{cl} \cdot t + k_{cl}$, where $\mu_{cl}$ is a learned energy rate (kWh/s or kilowatt per hour, per second) for maintaining the climate setting of the climate control system 107 of the vehicle 104 under a current temperature condition (e.g., steady state energy usage rate), t (s) is the trip period time, and $K_{cl}$ (kWh) which is a learned extra energy usage for bringing the current cabin temperature up or down to the target temperature (e.g., transient energy usage).

The value of $\mu_{cl}$ can be obtained from a lookup table of learned parameters. The input to the lookup table includes the outside temperature $T_{out}$, which is obtained from a third-party weather service or system (see third-party system 107 of FIG. 1), in some embodiments. Thus, $\mu_{cl}$ is determined based on a relationship of $\mu_{cl} = \mu_{cl}(T_{out})$ in some instances. An example lookup table is provided below:

TABLE 1

| Outside T. | <−40 | −30 | −20 | ... | 30 | 40 | >50 |
|---|---|---|---|---|---|---|---|
| Efficiency | | | | | | | |

If the trip period time frame is long and the temperature change is significant along the trip due to time and location change, the average efficiency from multiple temperature values can be used and calculated using $$\mu_{cl} = \frac{\mu_{cl}(T_{out,1}) + \mu_{cl}(T_{out,2}) + \ldots + \mu_{cl}(T_{out,n})}{n},$$

where the value of the trip period time t is estimated by the navigation system or vehicle controller of the vehicle. The value of $K_{cl}$ can be obtained from another example lookup table of learned parameters. The inputs to the lookup table are the initial cabin temperature $T_{cab}$ and the outside temperature $T_{out}$. Thus, $K_{cl} = K_{cl}(T_{cab}, T_{out})$. In some embodiments, the cabin temperature is obtained from the vehicle, and the outside temperature is obtained from a third-party weather data service or system.

TABLE 2

| Initial Cabin T.\Outside T. | <−40 | −30 | −20 | ... | 30 | 40 | >50 |
|---|---|---|---|---|---|---|---|
| <−40 | | | | | | | |
| ... | | | | | | | |
| >50 | | | | | | | |

The vehicle accessories-based energy consumption parameter can be calculated using $E_{acc} = \mu_{acc} \cdot t$, where $\mu_{acc}$ is the learned energy rate (kWh/s) for accessory energy, and t is the trip period time. The value of $\mu_{acc}$ can be obtained directly from learned parameters.

The temperature-based energy loss parameter (e.g., energy loss as a result of external factors) can be calculated using $E_{lo} = \mu_{lo} \cdot t + K_{lo}$, where $\mu_{lo}$ the learned energy rate (kWh/s) for maintaining the vehicle temperature under the current temperature condition (steady state energy usage rate), t is the trip period time, and $K_{lo}$ is the learned extra energy usage for bringing the current vehicle temperature up to the target temperature (transient energy usage). The value of $\mu_{lo}$ is obtained from the lookup Table 1 which includes learned parameters. The input to the lookup table is the outside temperature $T_{out}$. Again, $\mu_{lo}$ is determined according to a relationship $\mu_{lo} = \mu_{lo}(T_{out})$, in some embodiments. If the trip is long and the temperature change is significant along the trip due to time and location change, the average efficiency from multiple temperature values can be used.

The following equation can be used to calculate the average value $$\mu_{lo} = \frac{\mu_{lo}(T_{out,1}) + \mu_{lo}(T_{out,2}) + \ldots + \mu_{lo}(T_{out,n})}{n},$$

where the value of $K_{lo}$ is obtained from a lookup Table 2 of the learned parameters. The inputs to the lookup table are the initial cabin temperature $T_{cab}$ and the outside temperature $T_{out}$. Again, $K_{lo}=K_{lo}(T_{cab}, T_{out})$, in some embodiments.

The following description provides details regarding calculating energy consumption for operating the vehicle after completion of the planned route. This period was referred to as a post-trip period or beyond-the-trip prediction horizon. This period starts at the end of the trip period, which has a known route, and ends at a roughly estimated DTE end. The roughly estimated DTE uses the following DTE algorithm: $D_{beyond,start}=D_{trip}$, and $$D_{beyond,end} = D_{trip} + \frac{E_{bat} - E_{trip}}{\eta_{ave}},$$

where $\eta_{ave}$ is the overall average energy rate (kWh/km). In some embodiments, this is a pre-calibrated constant. Thus, $D_{beyond}=D_{beyond,end}-D_{beyond,start}$, in some embodiments.

It should be noted that this distance may be adjusted as $D_{beyond,end}$ may be adjusted. For example, if the time horizon of this distance is longer than 10 days, it may be truncated to an estimated 10-day driving distance using historical weekly operation data, if the weather forecast is only available for 10 days. Again, the post-trip period or beyond-the-trip prediction horizon start time is the end time of the trip period using the known route. Its end time is determined using the learned weekly operation pattern table (additional details on learned parameters are described infra). An example of the learned weekly operation pattern table is shown below in Table 3.

In some embodiments, if the horizon passes the end of a week, it should be continued to the next week. The operation pattern for the next week is considered the same as the stored table, in various embodiments. In other embodiments, if the horizon end is longer than 10 days after the current day, it may be cut off at the $10^{th}$ day, and the post-trip period or beyond-the-trip prediction horizon distance $D_{beyond}$ may be adjusted accordingly as well. The new distance is understood to include a sum of the average driving distances from the start of the horizon to the end of the $10^{th}$ day. While 10-day examples have been provided herein, other time frames can likewise be utilized.

The method can also include decomposing the energy consumption in the post-trip period. The energy consumption in the post-trip period may be calculated as a sum of the energy consumption in every time window within the post-trip period as follows: $E_{beyond}=\Sigma_j E_{beyond,j}$. The time windows may be defined the same as the time windows in the weekly operation pattern learning. Relating back to Table 4, the first time window (Mon. 0-2 am) and the last time window (Fri. 4-6 pm), are very likely to be only partially covered by the prediction horizon. In this example, various compensating processes can be used. In one process, the system can consider that it is a fully included time window, and adjust the post-trip period prediction horizon distance accordingly. In other embodiments, the system can discard one or more time windows, and adjust the post-trip period prediction horizon distance accordingly. In yet another embodiment, one or more of the windows can be considered as a partially included time window, and the estimated energy consumption can be adjusted by a ratio.

In various embodiments, a calculation of energy consumption in each of the time windows can be performed. Within each time window within the post-trip period pre-

TABLE 3

|  | Mon. 0-2 am | Mon. 2-4 am | Mon. 4-6 am | ... | Tue. 6-8 am | Tue. 8-10 am | ... | Fri. 4-6 pm | ... |
|---|---|---|---|---|---|---|---|---|---|
| Average Distance (km) | 0.5 | 0 | 0 | ... | 10 | 1 | ... | 15 | ... |
| Average Trip Time (s) | 30 | 0 | 0 | ... | 1600 | 60 | ... | 1700 | ... |
| Average Energy for Driving (kWh) | 0.2 | 0 | 0 | ... | 2 | 0.2 | ... | 2.5 | ... |
| Average Number of Cold Start | 0.1 | 0 | 0 | ... | 0.9 | 0 | ... | 0.8 | ... |
| Average Temperature Difference of Cold Start (T_cab − T_out) | −10 | 0 | 0 | ... | 0.9 | 0 | ... | 0.8 | ... |

In some embodiments, an average driving distance in every time window in a week can be stored in Table 3 as the learned parameters. Then, starting from a beginning of the post-trip period time, after covering the prediction horizon distance, the end time can be found using Table 4.

diction horizon, the sum of the energy consumption in the four parameters can be calculating using: $E_{beyond,j}=E_{dr}+E_{cl}+E_{acc}+E_{lo}$. Again, $E_{dr}$ represents the driving-based energy consumption parameter, $E_{cl}$ represents the climate control-based energy consumption parameter, $E_{acc}$ represents the

TABLE 4

|  | Mon. 0-2 am | Mon. 2-4 am | Mon. 4-6 am | ... | Tue. 6-8 am | Tue. 8-10 am | ... | Fri. 4-6 pm | ... |
|---|---|---|---|---|---|---|---|---|---|
| Average Distance (km) | 0.5 | 0 | 0 | ... | 10 | 1 | ... | 15 | ... |

Beyond the trip prediction horizon-e.g. 120 km vehicle accessories-based energy consumption parameter, and $E_{lo}$ represents the temperature-based energy loss parameter.

With respect to the driving-based energy consumption parameter, the energy for driving the wheels in a time window may be the historical average energy for driving the wheels in this time window. It can be directly obtained from the learned weekly operation pattern table.

With respect to the climate control-based energy consumption parameter, the following equation can be used: $E_{cl}=\mu_{cl} \cdot t+N \cdot K_{cl}$, where $\mu_{cl}$ is the learned energy rate (kWh/s), t (s) is the expected driving time, and $K_{cl}$ (kWh) is the learned transient extra energy usage. N is the expected number of trips with cold starts in this time window. The value of $\mu_{cl}$ is obtained from a lookup table of the learned parameters, as with the examples provided above (see Table 1). The input to the lookup table is the outside temperature $T_{out}$ at the time of the time window, which is obtained from a third-party weather data service or system. To be sure, $\mu_{cl}=\mu_{cl}(T_{out})$. In some embodiments, the value of t can be obtained from the learned weekly operation pattern table, the value of N can be obtained from the learned weekly operation pattern table, and the value of $K_{cl}$ can be obtained from a lookup table of the learned parameters (see Table 2 as an example). The input to the lookup table can include the initial cabin temperature $T_{cab}$ and the outside temperature $T_{out}$. In some embodiments, $K_{cl}=K_{cl}(T_{cab}, T_{out})$, where the cabin temperature is obtained using $T_{out}$ and the expected temperature difference $\Delta T$ is obtained from the learned weekly operation pattern table. In sum, $T_{cab}=T_{out}+\Delta T$, in some embodiments.

In various embodiments, the vehicle accessories-based energy consumption parameter can be calculated using $E_{acc}=\mu_{acc} \cdot t$, where $\mu_{acc}$ is the learned energy rate (kWh/s) for accessory energy, and t is the expected driving time. The value of $\mu_{acc}$ may be obtained directly from the saved learned parameters.

According to some embodiments, the temperature-based energy loss parameter can be calculated using the following equation: $E_{lo}=\mu_{lo} \cdot t+N \cdot K_{lo}$, where $\mu_{lo}$ is the learned energy rate (kWh/s), t (s) is the expected driving time, and $K_{lo}$ (kWh) is the learned transient extra energy usage. N is the expected number of trips with cold starts in this time window. The value of $\mu_{lo}$ is obtained from a one-dimensional lookup table of the learned parameters. The input to the lookup table is the outside temperature $T_{out}$ at the time of the time window, which is obtained from a third-party weather data service or system. Thus, $\mu_{lo}=\mu_{lo}(T_{out})$, in some embodiments, where the value of t is obtained from the learned weekly operation pattern table. The value of N is obtained from the learned weekly operation pattern table, and the value of $K_{lo}$ is obtained from a two-dimensional lookup table of the learned parameters (see Table 2 above). The inputs to the lookup table are the initial cabin temperature $T_{cab}$ and the outside temperature $T_{out}$. In various embodiments, $K_{lo}=K_{lo}(T_{cab}, T_{out})$, where the cabin temperature is obtained using $T_{out}$ and the expected temperature difference $\Delta T$ is obtained from the learned weekly operation pattern table. In sum, $T_{cab}=T_{out}+\Delta T$, in various embodiments.

The energy rate for the post-trip period (e.g., beyond-the-trip horizon) can be calculated using the total energy consumption in the post-trip period prediction horizon divided by the distance of the post-trip period prediction horizon using the following equation:

$$\eta_{beyond} = \frac{E_{beyond}}{D_{beyond}}.$$

Referring back to FIG. 1, as noted above, some data obtained by the vehicle controller of the vehicle may not be utilized in the numerous calculations disclosed above, but nevertheless may provide value to a vehicle operator, a vehicle manufacturer, or other similar entity. Also, as mentioned above, some embodiments include DTE calculations performed by the service provider 102 and specifically the efficiency prediction module 120 of the service provider 102. In some embodiments, the DTE estimates can be calculated onboard the vehicle 104 by the vehicle controller 108.

In various embodiments, energy rate results transmitted to the vehicle 104 by the service provider 102 include not only the overall energy rate, but also additional information for the onboard modules to calculate future DTE. This allows for DTE calculation or refinement even when a connection to the service provider 102 is lost. In some embodiments, energy rate numbers (in kWh/km) and a trip length are transmitted to the vehicle 104. If $E_{dr}^t$, $E_{cl}^t$, $E_{acc}^t$, $E_{lo}^t$ are the energy consumption in four categories within the trip period, four energy rates $$\eta_{dr}^t = \frac{E_{dr}^t}{D_{trip}}, \eta_{cl}^t = \frac{E_{cl}^t}{D_{trip}}, \eta_{acc}^t = \frac{E_{acc}^t}{D_{trip}}, \text{ and } \eta_{lo}^t = \frac{E_{lo}^t}{D_{trip}}$$

can be transmitted to the vehicle 104. If $E_{dr}^b$, $E_{cl}^b$, $E_{acc}^b$, $E_{lo}^b$ are the energy consumption in four categories in the post-trip period prediction horizon, four energy rates $$\eta_{dr}^b = \frac{E_{dr}^b}{D_{beyond}}, \eta_{cl}^b = \frac{E_{cl}^b}{D_{beyond}}, \eta_{acc}^b = \frac{E_{acc}^b}{D_{beyond}}, \text{ and } \eta_{lo}^b = \frac{E_{lo}^b}{D_{beyond}}$$

may be sent. The trip distance $D_{trip}$ may also be sent to the vehicle 104.

According to some embodiments, comparisons between estimated energy consumption and actual energy consumption can be performed in order to verify the accuracy of the DTE algorithms and improve or optimize calculations. Before comparing the actual trip energy consumption with the predicted energy consumption, it may be advantageous to compare the actual trip route with the planned trip route. The route comparison can be done onboard using the vehicle controller 108. Therefore, if the planned trip route geometry data is not available onboard, such data may be sent to the vehicle 104 by the service provider 102. The planned route data is a sequence of longitudes and latitudes for important geometry waypoints along the route, and such data can be sent to the vehicle 104 before the trip starts.

Example methods for complete calculations of DTE estimates are provided below. Current data for battery energy available $E_{bat}$ may be used when calculating DTE estimates. A DTE estimate can be calculated using:

$$D_{CE-DTE} = D_{trip} + \frac{E_{bat} - E_{trip}}{\eta_{beyond}} = D_{trip} + \frac{E_{bat} - D_{trip}(\eta_{dr}^t + \eta_{cl}^t + \eta_{acc}^t + \eta_{lo}^t)}{\eta_{dr}^b + \eta_{cl}^b + \eta_{acc}^b + \eta_{lo}^b}.$$

During the trip period, if the distance into the trip is D, the remaining distance of the trip is $D_{trip}^r = D_{trip} - D$, and $$D_{CE-DTE} = D_{trip}^r + \frac{E_{bat} - D_{trip}^r(\eta_{dr}^t + \eta_{cl}^t + \eta_{acc}^t + \eta_{lo}^t)}{\eta_{dr}^b + \eta_{cl}^b + \eta_{acc}^b + \eta_{lo}^b}.$$

After the trip, $D_{trip}^r = 0$, then $$D_{CE-DTE} = \frac{E_{bat}}{\eta_{dr}^b + \eta_{cl}^b + \eta_{acc}^b + \eta_{lo}^b}.$$

The following sections provide additional details on aspects of parameter learning that can be accomplished using the onboard machine learning module 114 of the vehicle controller 108. While parameter learning can be implemented onboard, output of the parameter learning can be stored onboard, as well as uploaded to the service provider 102 when desired. To be sure, these learned parameters are used in the example processes of FIGS. 3A and 3B.

The following parameters can be learned by the onboard machine learning module 114. In some embodiments, energy rates (kWh/km) for driving the wheels on every road class can be determined. These are referred to as learned road class efficiency for the vehicle. In some embodiments, these data can be stored as a one-dimensional table for $\eta_i$, which is the learned driving energy rate on Road Class i. In some embodiments, the onboard machine learning module 114 can learn steady state energy rates (kWh/s) for climate control under different outside temperatures. Again, these data can be stored in a one-dimensional lookup table for $\mu_{cl}(T_{out})$. In various embodiments, the onboard machine learning module 114 can learn extra transient energy usage in climate control for bringing the current cabin temperature up or down to the target temperature. As noted above, these data can be stored in a two-dimensional lookup table for $K_{cl}(T_{cab}, T_{out})$.

In some embodiments, the onboard machine learning module 114 can learn energy rater (kWh/s) for accessories, which is a learned number $\mu_{acc}$. In one or more embodiments, the onboard machine learning module 114 can learn steady state energy rate loss as a result of external factors (e.g., low temperature) (kWh/s) under different outside temperatures. To be sure, these data is stored in a one-dimensional lookup table for $\mu_{lo}(T_{out})$. The onboard machine learning module 114 can learn extra transient energy usage loss as a result of external factors (e.g., low temperature), which can be stored in a two-dimensional lookup table for $K_{lo}(T_{cab}, T_{out})$. In general, these various learned parameters can be determined using the onboard machine learning module 114, which monitors signal output from each of the drivetrain system 105, the climate control system 107, and the individual vehicle accessories 109.

In some embodiments, data collected from these various vehicle systems can be stored. For example, vehicle weekly operation pattern parameters can be obtained and stored in a table or other similar data structure. For example, a week can be divided into M time windows, and the average operation attributes in every time window can be learned and stored. In some embodiments, the onboard machine learning module 114 can calculate and store an average driving distance in every time window, an average driving time in every time window, an average number of trip cold starts in every time window, an average energy for driving in every time window, and an average temperature difference $T_{cab} - T_{out}$ at trip cold starts in every time window.

In some embodiments, when energy consumption parameters are learned, some initializing values may be used. That is, for parameter x to be learned, an initial value $x_0$ will be stored before learning by the onboard machine learning module 114 starts. These initial values should be able to provide a reasonable DTE estimation before learning starts. If the parameter stored in the vehicle is $x_{st}$, a new updated value for this parameter is $x_{latest}$, and the new parameter stored can be updated as a weighted sum of the old parameter stored and the latest value. This replacement process is represented as: $x_{st+} = \lambda \cdot x_{st} + (1-\lambda) \cdot x_{latest}$, where $\lambda$ can be considered as a forgetting factor. Each parameter can utilize a different forgetting factor in some embodiments.

After initializing values are used, the calculations of various energy consumption parameters can be updated using real-time acquired data from the various components of the vehicle that contribute to energy consumption and/or loss. In some embodiments, energy rates (kWh/km) for driving the wheels on every road class can be updated. In one example, for every one km driven by the vehicle, the average speed $v_{ave}$ of the vehicle can be calculated as follows:

$$v_{ave} = \frac{d_{end} - d_{start}}{t_{end} - t_{start}}.$$

Also, an average road grade $\theta_{ave}$ is obtained (can be obtained from navigation data from a third-party navigation or mapping system or from an onboard navigation or mapping feature). The energy used for driving the wheels during this period is $E_{dr}$. Thus, the energy rate is calculated as:

$$\eta_{dr} = \frac{E_{dr}}{d_{end} - d_{start}}.$$

If $v_{ave}$ and $\theta_{ave}$ fall into Road Class i, $\eta_{dr}$ can be used to update $\eta_i$ using the general parameter updating rules.

Steady state energy rates (kWh/s) for climate control under different outside temperatures can also be updated. During vehicle operation, after the first 10 minutes (example time frame that can be varied), and every 10 minutes, the climate control energy usage is $E_{cl}$, and the energy rate for climate control is $$\mu_{cl} = \frac{E_{cl}}{t}.$$

An outside temperature is $T_{amb}$. $\mu_{cl}$ and this value can be used to update the corresponding value in the one-dimensional lookup table for $\mu_{cl}(T_{out})$ using the general parameter updating rules.

Extra transient energy usage in climate control for bringing the current cabin temperature up or down to the target temperature can also be updated. During vehicle operation, in the first 10 minutes (example time frame that can be varied), the climate control energy usage is $E_{cl}$. The extra transient energy usage in climate control is $E_{cl\_t} = E_{cl} - \mu_{cl}(T_{out}) \cdot t$. The outside temperature is $T_{amb}$. The cabin temperature at trip start $T_{cab}$. $E_{cl\_t}$ may be used to update the corresponding value in the two-dimensional lookup table for $K_{cl}(T_{cab}, T_{out})$ using the general parameter updating rules. If the trip is shorter than 10 minutes (example time frame that can be varied), no update may be made to the $K_{cl}(T_{cab}, T_{out})$ two-dimensional lookup table.

In various embodiments, an energy rate (kWh/s) for accessories can be updated. During vehicle operation, if the accessory energy is $E_{acc}$, then the energy rate for accessories is $$\mu_{acc} = \frac{E_{acc}}{t}.$$

$\mu_{acc}$ and may be used to update the stored energy rate for the accessories value using the general parameter updating rules.

In various embodiments, the steady state energy rate loss as a result of external factors (e.g., low temperature) (kWh/s) under different outside temperatures can be updated. During vehicle operation, after the first 10 minutes (again, merely an example), and every 10 minutes, the energy loss is $E_{lo}$, and the energy rate for energy loss is $$\mu_{lo} = \frac{E_{lo}}{t}.$$

The outside temperature is $T_{amb}$. $\mu_{cl}$ and may be used to update the corresponding value in the one-dimensional lookup table for $\mu_{lo}(T_{out})$ using the general parameter updating rules.

Extra transient energy usage loss as a result of external factors (e.g., low temperature) can also be updated in some instances. During vehicle operation, in the first 10 minutes, the energy loss is $E_{lo}$. The extra transient energy loss in climate control is $E_{lo\_t}=E_{lo}-\mu_{lo}(T_{out})\cdot t$. The outside temperature is $T_{amb}$. The cabin temperature at trip start is $T_{cab}\cdot E_{lo\_t}$ and may be used to update the corresponding value in the two-dimensional lookup table for $K_{lo}(T_{cab}, T_{out})$ using the general parameter updating rules.

Again, if the trip is shorter than 10 minutes (or shorter than whatever established time frame is used), no update may be made to the $K_{lo}(T_{cab}, T_{out})$ two-dimensional lookup table.

In some embodiments, vehicle operation pattern parameters can be updated on a daily or a weekly basis. In some embodiments, an update is implemented at the end of each time window and/or at the start of every trip. At the start of every trip, a check can be performed if there are time windows that were not updated between the last update and the current time. If there are time windows that were not updated, an update for those time windows can be performed. Even if the vehicle was not running during a time window, an update is needed because some (but not all) of the average attributes may change if the driving time was zero. Some updates are conducted using the general parameter updating rules. For example, an average driving distance in every time window can be updated. The driving distance is the total distance in the time window, which may be the sum of the distances in multiple trips. If the vehicle is not driven in the time window, the updated value for the average driving distance is zero. Also, an average driving time in every time window can be updated. The driving time is the total time in the time window, which may be the sum of the driving time in multiple trips. If the vehicle is not driven in the time window, the updated value for the average driving time is zero.

In various embodiments, the average number of trip cold starts in every time window can be updated. To be sure, a cold start is defined as a vehicle start event that is at least 60 minutes after the last vehicle shutdown. If the vehicle is not driven in the time window, the updated value for the average number of cold starts is zero.

In some embodiments, an average energy for driving in every time window can be updated. The driving time is the total energy for driving the wheels in the time window, which may be the sum of multiple trips. If the vehicle does not run in the time window, the updated value for the average energy for driving is zero. Also, an average temperature difference $T_{cab}-T_{out}$ at trip cold starts in every time window can be updated. This temperature difference is calculated at trip cold starts. If there are multiple cold starts in a time window, multiple updates are needed. If there are no cold starts in a time window, this value may not be updated.

As noted throughout, the systems and methods disclosed herein can operate in a real-time or continuous manner in some embodiments, where learning parameters are being updated in real-time or near-real-time from feedback such as comparisons of the estimated DTE and the actual DTE or the estimated energy consumption versus the empirical or actual energy consumption. To be sure, discrepancies between estimated versus actual values for any of these measurements indicates a need to improve the DTE or energy consumption methods.

According to some embodiments, a buffering of the predicted total energy for the trip period having a known route is performed. In some embodiments, when a DTE estimate is calculated, the data sent from the service provider 102 to the vehicle 104 includes information about the predicted total trip energy usage $E_{trip}^{pred}$, where $E_{trip}^{pred}=D_{trip}(\eta_{dr}^{t}+\eta_{cl}^{t}+\eta_{acc}^{t}+\eta_{lo}^{t})$. $E_{trip}^{pred}$ may be stored in the vehicle controller 108 until a detour from a planned route is detected or the trip is completed and the trip energy feedback comparison is made.

The vehicle controller 108 can be configured to detect a detour in a trip (e.g., planned trip). The comparison of the predicted energy consumption and the actual energy consumption may only be made if the vehicle follows the route used to calculate the DTE. Two example types of detour detection may be implemented by the vehicle controller 108 to determine if the vehicle really follows the planned route. In one embodiment, the vehicle controller 108 is configured to detect a detour using GPS and route geometry. In some embodiments, this process involves interpolating route waypoints. The route geometry data sent from the service provider 102 to the vehicle 104 can comprise a sequence of waypoints. The road segment between two points is considered a straight line. If the distance between two adjacent points is longer than 500 meters, one or more interpolation points may be added. The resultant sequence of points should have a maximum distance of 500 meters between two adjacent points. Next, the vehicle controller 108 can detect a detour by calculating the distance from the vehicle to the route. Detecting a detour by comparing the vehicle GPS and route geometry can be conducted periodically on the vehicle (every 30 seconds or one minute as an example).

The distance from the vehicle's current GPS location to the closest waypoint in the route geometry sequence can be calculated. There are a few ways to make the calculation more efficient than looping through all points. In some embodiments, the vehicle controller 108 can build a k-dimensional tree of all route waypoints at the start of the trip, and use the k-dimensional tree to find the closest point and the closest distance. Alternatively, the vehicle controller 108 can track the closest point, the route distance from start to the closest point, and the distance driven for the trip. The vehicle controller 108 can use this information to narrow down the closest point candidates and only loop through a few points to find the closest. If the distance from the vehicle to the closest waypoint on the route is larger than three kilometers, the vehicle is considered to have detoured from the planned route.

In another alternative method, the vehicle controller 108 can detect a detour of the vehicle from a planned route by measuring the trip distance. Detecting a detour by comparing the vehicle's traveled distance and the planned trip distance is conducted at the end of the trip, in some embodiments. The end of the trip time is determined by the distance of the current vehicle's GPS location and the trip end location. If the distance is shorter than a threshold, the vehicle is considered to have reached the end of the trip.

When the vehicle reaches the end of the trip, the actual distance driven is calculated by the vehicle controller 108 from the odometer difference at the start and the end of the trip. If this driven distance is more than two kilometers shorter or longer than $D_{trip}$ (which the vehicle controller 108 received at the start of the trip when the DTE is calculated by the service provider 102), the vehicle is considered to have made a detour from the planned trip route.

In some embodiments, the feedback comparator module 118 can be executed to compare an actual trip energy consumption with the predicted trip energy consumption. After a trip is completed, the actual energy consumption of the trip is calculated by the feedback comparator module 118 from the battery energy available difference at the start and end of the trip such that $E_{trip}^{actual} = E_{bat}(t_{start}) - E_{bat}(t_{end})$. If the vehicle does not make any detour from the planned trip route, the difference (or relative difference) between $E_{trip}^{actual}$ and $E_{trip}^{pred}$ may be calculated by the feedback comparator module 118. The predicted and actual energy consumption in each of the four categories $E_{dr}$, $E_{cl}$, $E_{acc}$, $E_{lo}$ can also be compared by the feedback comparator module 118. By looking at the difference between the predicted value and the actual value in each category, the feedback comparator module 118 can generate notifications to the driver (displayed on the HMI of the vehicle 104) to explain what caused the previous DTE estimation error, if the previous DTE estimation was inaccurate.

For example, if the difference in energy for the climate control category is significant, the feedback comparator module 118 could inform the driver that the previous DTE estimation error was due to the unexpected energy usage from the climate control system. If the difference in the energy for driving the wheels is significant, the feedback comparator module 118 may first compare the predicted trip time with the actual trip time. If the trip time difference is significant, the cause of the DTE inaccuracy could be the traffic information inaccuracy. Otherwise, the feedback comparator module 118 can infer that there is a model error. The feedback comparator module 118 can then execute a process whereby the model is updated by the efficiency prediction module 120 of the service provider 102.

As noted, when the vehicle is running periodically (such as every five minutes), some summary values that are calculated and temporarily stored may be sent to the service provider 102. Example calculated values include energy used for propelling the wheels of the vehicle, energy regenerated from braking, energy for climate control, energy for accessories, energy loss and energy for low temperature, average speed, speed variance, average propelling torque, propelling torque variance, positive propelling torque time, average brake torque, brake torque variance, positive brake torque time, distance drive, battery (e.g., energy source) energy available at the start (and the end) of the period, battery state of charge at the start (and the end) of the period, and GPS location at the start (and the end) of the period—just to name a few examples.

In some embodiments, some data types are collected and stored upon the occurrence of a triggering condition or event. The following data are stored when a certain event occurs. Usually the events are "value changes" if not specified. The value along with the event time stamp will be temporarily stored onboard and sent to the service provider 102 in some embodiments. Example data includes cabin temperature, ambient temperature, DTE API call input and response (e.g., communications between the vehicle 104 and the service provider 102 during DTE calculations), climate settings, regeneration braking setting and drive modes, a user profile, a trailer status (connected or disconnected), and power-to-the-box—just to name a few.

Figure 4:
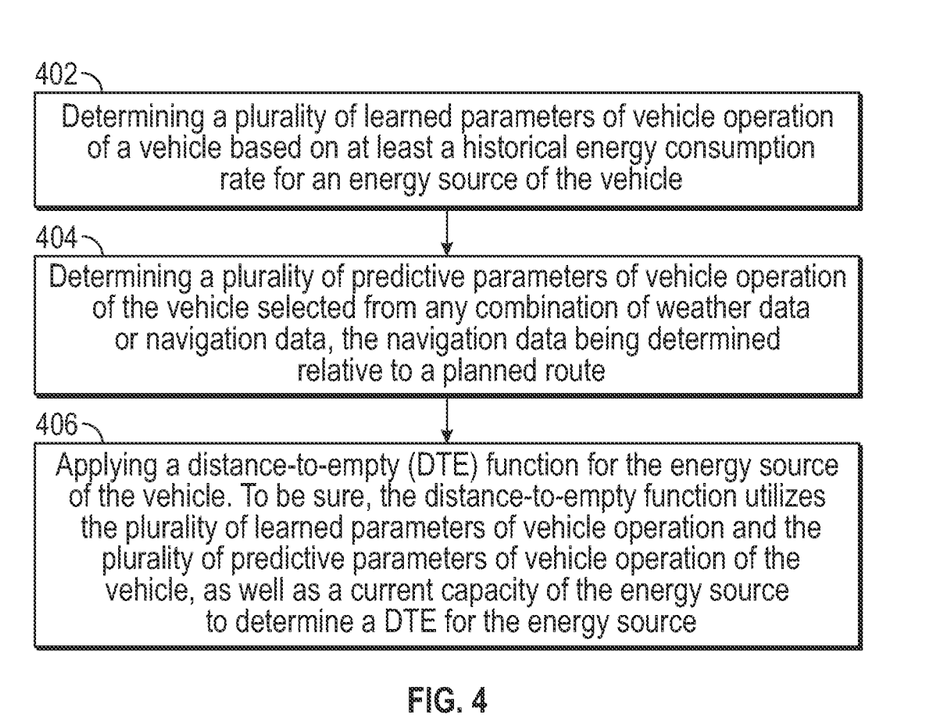
FIG. 4 is a flowchart of an example method that can be performed in accordance with various embodiments disclosed herein.

FIG. 4 illustrates an example flowchart of a method of the present disclosure. The method generally includes a step 402 of determining a plurality of learned parameters of vehicle operation of a vehicle based on a plurality of energy consumption parameters of the vehicle. These data can be determined from various historical energy consumption rates for various systems within the vehicle. Again, these learned parameters can include learned road class efficiency for the vehicle, learned temperature-based energy loss for the vehicle, a learned cold start-based energy loss for the vehicle, learned transient extra energy for climate control, learned efficiency for climate control, and learned efficiency for vehicle accessories. These learned parameters can be used to calculate energy consumption parameters such as a driving-based energy consumption parameter, a temperature-based energy consumption parameter, a climate control-based energy consumption parameter, and a vehicle accessories-based energy consumption parameter.

The method also includes a step 404 of determining a plurality of predictive parameters of vehicle operation of the vehicle selected from any combination of weather data or navigation data, the navigation data being determined relative to a planned route. This can include obtaining weather data, traffic data, elevation change data for various road classes, and so forth.

The method also includes a step 406 of applying a distance-to-empty (DTE) function for the energy source of the vehicle. To be sure, the distance-to-empty function utilizes the plurality of learned parameters of vehicle operation and the plurality of predictive parameters of vehicle operation of the vehicle, as well as a current capacity of the energy source to determine a DTE for the energy source.

EXAMPLE EMBODIMENTS

In some instances, the following examples may be implemented together or separately by the systems and methods described herein.

Example 1 may include a method, comprising: determining a plurality of learned parameters of vehicle operation of a vehicle based on a plurality of energy consumption parameters of the vehicle; determining a plurality of predictive parameters of vehicle operation of the vehicle selected from any combination of weather data or navigation data, the navigation data being determined relative to a planned route; and applying a distance-to-empty (DTE) function for the energy source, the DTE function utilizing the plurality of learned parameters of vehicle operation, the plurality of predictive parameters of vehicle operation of the vehicle, and a current capacity of the energy source to determine a DTE for the energy source.

Example 2 may include the method according to example 1, wherein the plurality of predictive parameters of vehicle operation further comprises road class data and the weather data includes at least temperature data, wherein the road class data comprises real-time traffic speed, average road slope, and real-time traffic conditions.

Example 3 may include the method according to example 1 and/or some other example herein, wherein the plurality of learned parameters of vehicle operation of the vehicle are collected over time and with reference to a specific driver, and the plurality of learned parameters of vehicle operation of the vehicle further comprises driving style, climate control preferences, and an average weekly vehicle operation schedule.

Example 4 may include the method according to example 1 and/or some other example herein, wherein the DTE is calculated for any of a trip period of the planned route or a post-trip period.

Example 5 may include the method according to example 1 and/or some other example herein, further comprising: determining an actual energy consumption rate; and updating the DTE function based on deviations between the actual energy consumption rate and the historical energy consumption rate.

Example 6 may include the method according to example 5 and/or some other example herein, wherein the deviations between the actual energy consumption rate and the historical energy consumption rate are calculated and the DTE function is only updated when the vehicle utilizes the planned route.

Example 7 may include the method according to example 1 and/or some other example herein, wherein when the planned route is complete the DTE function is used to re-estimate the DTE by calculating a predicted overall energy consumption rate by: determining a distance of a post-trip operation of the vehicle; estimating an energy consumption of the post-trip operation; and estimating an energy consumption rate of the post-trip operation based on the distance and the energy consumption estimated for the post-trip operation.

Example 8 may include a method for estimating energy consumption for a vehicle, the method comprising: determining a plurality of energy consumption parameters for a vehicle on a planned route by: calculating a first driving-based energy consumption parameter based on any combination of a distance that the vehicle will travel on a planned route over a specified road class, real-time traffic data, and a learned road class efficiency for the vehicle; calculating a first temperature-based energy consumption parameter based on any combination of a learned temperature-based energy loss for the vehicle based on outdoor temperature data, and a learned cold start-based energy loss for the vehicle which is a function of the outdoor temperature data and a current vehicle temperature; calculating a first climate control-based energy consumption parameter based on any combination of a learned transient extra energy for climate control, which is a function of an initial cabin temperature data and the outdoor temperature data, and a learned efficiency for climate control which is a function of the outdoor temperature data; and calculating a first vehicle accessories-based energy consumption parameter based on a learned efficiency for vehicle accessories; and estimating the energy consumption of the vehicle using the plurality of energy consumption parameters.

Example 9 may include the method according to example 8, further comprising calculating an energy consumption for operating the vehicle after completion of the planned route by: calculating a second driving-based energy consumption parameter based on an expected energy consumption for driving the vehicle; calculating a second temperature-based energy consumption parameter based on any combination of the learned temperature-based energy loss for the vehicle based on future outdoor temperature data, and a learned cold start-based energy loss for the vehicle which is a function of the future outdoor temperature data and a predicted vehicle temperature; calculating a second climate control-based energy consumption parameter based on any combination of a learned transient extra energy for climate control, which is a function of a predicted initial cabin temperature data and future outdoor temperature data, and a learned efficiency for climate control which is a function of the future outdoor temperature data; and utilizing the first vehicle accessories-based energy consumption parameter.

Example 10 may include the method according to example 8 and/or some other example herein, wherein the learned road class efficiency for the vehicle comprises energy rates for driving the vehicle on a plurality of road classes.

Example 11 may include the method according to example 8 and/or some other example herein, wherein the learned efficiency for climate control comprises steady state energy rates for climate control of the vehicle calculated over a range of outdoor temperature values.

Example 12 may include the method according to example 8 and/or some other example herein, wherein the learned transient extra energy for climate control comprises a calculation of extra energy usage for climate control of the vehicle to ensure that a cabin temperature of the cabin is set to a target temperature.

Example 13 may include the method according to example 8 and/or some other example herein, wherein the learned temperature-based energy loss and the learned cold start-based energy loss each comprise steady state energy rate losses calculated over a range of outdoor temperature values.

Example 14 may include the method according to example 8 and/or some other example herein, further comprising determining operating pattern parameters of the vehicle that comprise any of: an average driving distance in each of a plurality of time windows; an average driving time in each of the plurality of time windows; an average number of trip cold starts in each of the plurality of time windows; an average of the first driving-based energy consumption parameter calculated over each of the plurality of time windows; and an average temperature difference at trip cold starts in each of the plurality of time windows.

Example 15 may include the method according to example 8 and/or some other example herein, further comprising displaying the energy consumption of the vehicle on a human machine interface of the vehicle.

Example 16 may include a system, comprising: a vehicle controller comprising at least one processor and a memory, the at least one processor executing instructions stored in the memory to: determine a plurality of learned parameters of vehicle operation of a vehicle based on at least a historical energy consumption rate for an energy source of the vehicle; determine a plurality of predictive parameters of vehicle operation of the vehicle selected from any combination of weather data or navigation data, the navigation data being determined relative to a planned route; and apply a distance-to-empty (DTE) function for the energy source, the DTE function utilizing the plurality of learned parameters of vehicle operation, and the plurality of predictive parameters of vehicle operation of the vehicle, based on a current capacity of the energy source to determine a DTE for the vehicle.

Example 17 may include the system according to example 16, wherein the plurality of predictive parameters of vehicle operation further comprises road class data and the weather data includes at least temperature data, wherein the road class data comprises real-time traffic speed, average road slope, and real-time traffic conditions, and further wherein the plurality of learned parameters of vehicle operation of the vehicle are collected over time and with reference to a specific driver, the plurality of learned parameters of vehicle operation of the vehicle further comprise driving style, climate control preferences, and an average weekly vehicle operation schedule.

Example 18 may include the system according to example 16 and/or some other example herein, wherein the at least one processor further executes the instructions stored in the memory to: sense an occurrence of a triggering condition; re-determine the plurality of learned parameters of vehicle operation of the vehicle based on the historical energy consumption rate for an energy source of the vehicle in view of the triggering condition; re-determine the plurality of predictive parameters of vehicle operation of the vehicle selected from any combination of the weather data or the navigation data in view of the triggering condition; and apply the distance-to-empty (DTE) function that utilizes the re-determined plurality of learned parameters of vehicle operation, and the re-determined plurality of predictive parameters of vehicle operation of the vehicle to re-calculate the DTE for the vehicle in view of the triggering condition.

Example 19 may include the system according to example 18 and/or some other example herein, wherein the triggering condition comprises connection of a trailer to the vehicle.

Example 20 may include the system according to example 16 and/or some other example herein, wherein the at least one processor further executes the instructions stored in the memory to: determine an actual energy consumption rate; and update the DTE function based on deviations between the actual energy consumption rate and the historical energy consumption rate, wherein when the planned route is complete and the current capacity of the energy source is at or above an empty threshold the at least one processor further executes the instructions stored in the memory to: utilize the DTE function to re-estimate the DTE by calculating a predicted overall energy consumption rate by: determining a distance of a post-trip operation of the vehicle; estimating an energy consumption of the post-trip operation; and estimating an energy consumption rate of the post-trip operation based on the distance and the energy consumption estimated for the post-trip operation.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for estimating energy consumption for a vehicle, the method comprising:
   determining a plurality of energy consumption parameters for a vehicle on a planned route by:
      calculating a first driving-based energy consumption parameter based on any combination of a distance that the vehicle will travel on a planned route over a specified road class, real-time traffic data, and a learned road-class efficiency for the vehicle;
      calculating a first temperature-based energy consumption parameter based on any combination of a learned temperature-based energy loss for the vehicle based on outdoor temperature data, and a learned cold start-based energy loss for the vehicle which is a function of the outdoor temperature data and a current vehicle temperature; and
      calculating a first climate control-based energy consumption parameter based on any combination of a learned transient extra energy for climate control, which is a function of an initial cabin temperature data and the outdoor temperature data, and a learned efficiency for climate control which is a function of the outdoor temperature data;
   determining, via a machine learning module, a plurality of operating parameters of the vehicle based on the plurality of energy consumption parameters, wherein the plurality of operating parameters comprises an average vehicle weekly operation schedule having an average driving distance in each time window, an average driving time in the each time window, an average number of trip cold starts in the each time window, an average energy for driving in the each time window, and an average temperature difference between inside the vehicle and outside the vehicle at trip cold starts in the each time window; and
   estimating the energy consumption of the vehicle using the plurality of energy consumption parameters.

2. The method according to claim 1, further comprising calculating an energy consumption for operating the vehicle after completion of the planned route by:
   calculating a second driving-based energy consumption parameter based on an expected energy consumption for driving the vehicle;
   calculating a second temperature-based energy consumption parameter based on any combination of the learned temperature-based energy loss for the vehicle based on future outdoor temperature data, and a learned cold start-based energy loss for the vehicle which is a function of the future outdoor temperature data and a predicted vehicle temperature;
   calculating a second climate control-based energy consumption parameter based on any combination of a learned transient extra energy for climate control, which is a function of a predicted initial cabin temperature data and future outdoor temperature data, and a learned efficiency for climate control which is a function of the future outdoor temperature data; and utilizing the first vehicle accessories-based energy consumption parameter.

3. The method according to claim 1, wherein the learned road class efficiency for the vehicle comprises energy rates for driving the vehicle on a plurality of road classes.

4. The method according to claim 1, wherein the learned efficiency for climate control comprises steady state energy rates for climate control of the vehicle calculated over a range of outdoor temperature values.

5. The method according to claim 1, wherein the learned transient extra energy for climate control comprises a calculation of extra energy usage for climate control of the vehicle to ensure that a cabin temperature of the cabin is set to a target temperature.

6. The method according to claim 1, wherein the learned temperature-based energy loss and the learned cold start-based energy loss each comprise steady state energy rate losses calculated over a range of outdoor temperature values.

7. The method according to claim 1, further comprising displaying the energy consumption of the vehicle on a human machine interface of the vehicle.

8. The method according to claim 1, further comprising:

applying a distance-to-empty (DTE) function for the energy source, the DTE function utilizing at least the plurality of operating parameters and a current capacity of the energy source to determine a DTE for the energy source.

* * * * *